Nov. 29, 1955  C. L. VAN WEYNSBERGEN ET AL  2,725,489
AUXILIARY VOLTAGE SUPPLY CIRCUIT
Filed Jan. 22, 1952
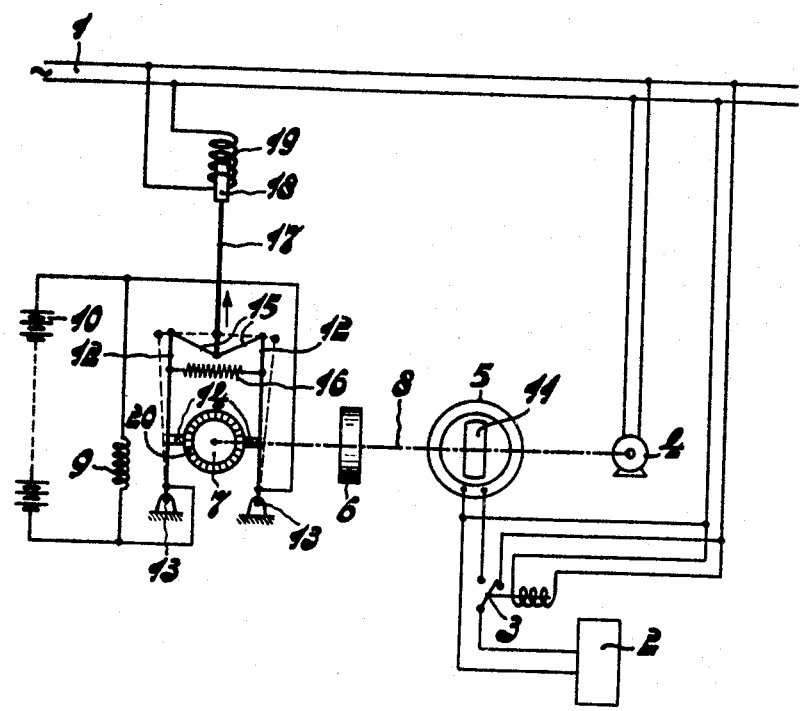
INVENTORS
Johan Frederik Hartwig
Charles Louis Van Weynsbergen
By [signature]
Agent

United States Patent Office 2,725,489
Patented Nov. 29, 1955

2,725,489

AUXILIARY VOLTAGE SUPPLY CIRCUIT

Charles Louis van Weynsbergen and Johan Frederik Hartwig, Hilversum, Netherlands, assignors to Hartford National Bank and Trust Company, Hartford, Conn., as trustee Application January 22, 1952, Serial No. 267,612

Claims priority, application Netherlands January 23, 1951

5 Claims. (Cl. 307—67)

This invention relates to a device for supplying electric current to a load when the feedline voltage, which during normal operation is directly supplied from the feedline to the load, fails. This device is particularly useful for amplifier stations with electrical communication systems or the like. The device includes a generator for the said current supply which is driven during normal operation by means of the feedline voltage, and whose kinetic energy is such that, in the event of feedline voltage failure, the voltage supplied to the load is substantially not interrupted and the load remains in operation until an electric motor is connected to a spare current source and is used to drive the generator. Such a device is disclosed in the German patent specification No. 721,448. This device comprises a converter, the alternating current generator part of which is connected to the feedline during normal operation and thus acts as a driving engine for keeping the required kinetic energy available. The direct current motor part is connected via a normally open electromagnetic relay to the spare current source, for example, an accumulator battery. If the feedline voltage fails, the connection of the feedline to the generator part and to the load is interrupted. Due to the flywheel operation, the voltage continues to be supplied to the load as the alternating current generator supplies the load without interruption. In the meantime, the relay is automatically closed within a very short time of say from 100 to 200 m. sec., with the result that the direct current motor, and hence also the generator, continues to be driven by the accumulator battery.

However, the said device has the disadvantage that on reappearance of the feedline voltage, when the still rotating generator is again required to be driven as a motor by the feedline voltage, synchronization between feedline voltage and generator voltage is necessary and this requires the provision of complicated synchronizing means in the device.

According to the invention, this disadvantage is avoided in that the device comprises a second electric motor for the drive during normal operation and in that the energizing field of the generator and preferably also that of the first-mentioned motor is always present, and hence also during normal operation, a high-speed switch being provided which, in the event of a fault of the mains, disconnects the load from the feedline and connects it to the generator.

The second electric motor may be of small size and low power, as the generator is unloaded during normal operation. The energy consumption of the second electric motor is thus much lower than the energy consumption of the generator running as a motor in the above-mentioned known device, since this generator has a high power output (and hence has high no-load losses) so as to be capable of providing the current supply to the load in the event of feedline voltage failure.

Since the energizing field of the generator is always present, no time is lost which would otherwise be required for first developing the field, that is to say the generator voltage is always present. Interruption of the current supply to the load is thus limited to the change-over period of the high-speed switch, which is very short, for example, of the order of about 10 to 20 m. sec. During this time current may be supplied to the load by separate means, for example, by a charged capacitor which, as it is, is present in the filter network. If also the field of the first-mentioned motor is always present, the coming into action of this spare motor is also restricted to the time period of connection to the spare current source. The time which would be required to develop an electro-magnetically energized field when connecting to an energizing current source is dependent upon several factors, such as the value of the voltage, the power output of the machine, the iron circuit and so forth but may be comparatively large.

Since in principle the time period required to connect the motor to the spare current source may be longer than the period of changing over the load to the already rotating emergency generator, it may be possible for the field of the motor to be developed even within this time period. However, if the field is already present, this measure has the advantage of doing away with a connecting relay. If also in addition the armature of the motor is connected via a fast acting relay, the required kinetic energy may be lower so that, for example, a separate flywheel may be dispensed with. The continuous supply of energy from the spare current source to the field energization with no-load is only very low and hence is no limitation.

In addition, the field energizations which are present both in the generator and in the motor may be supplied in many cases by permanent magnets so that the spare source current, in the present instance during normal operation, is not loaded at all.

According to a further feature of the device according to the invention, in which the first motor is provided with a commutator having brushes, provision is made of automatically operating means which during normal operation keep the brushes clear of the commutator, whereas in the event of feedline voltage failure the brushes are lowered so as to rest on the commutator. This, firstly, prevents wear of the commutator and its brushes also during normal operation and, secondly, avoids the so-called glazing of the commutator, which occurs when current is not removed. The current passage would be rendered difficult by this glazing.

In one embodiment of the invention the generator comprises slip rings provided with brushes and is connected to the load via a transformer, the primary winding of which is always connected to the generator. This prevents glazing since in normal operation the generator supplies the low no-load current of the transformer. In this embodiment the aggregate may be constituted by a single-armature convertor.

In an alternative embodiment the field of the generator is developed by one or more permanent magnets and the alternating current winding is connected to the load via the high-speed switch. Since in this case provision is not made of slip rings with brushes, glazing cannot occur.

In order that the invention may be more clearly understood and readily carried into effect, it will now be described more fully with reference to the accompanying drawing, in which the single figure is shown diagrammatically.

The alternating current feedline is designated 1. A load 2 is connected in normal operation to the feedline 1 via a high-speed switch 3 in the position shown. A combination comprising an auxiliary motor 4 of low output power, a generator 5, a flywheel 6 and a spare driving motor 7, all of them coupled to a shaft 8, is driven from the feedline in normal operation by the auxiliary motor 4 at no-load so that the output power of the auxiliary motor may be very low. The spare driving motor 7 is provided with a field winding 9 which is always connected to a spare current source 10 so that the field is always present. The field of the generator 5 is also always present since it is produced by a rotor 11 made of permanent magnet steel. If the generator 5 were provided instead with an energizing winding the latter would also be required to be connected to the spare current source 10. The motor 7 is equipped with a brush-lifting device comprising two levers 12 having fixed pivots 13, brushes 24, articulated arms 15, a retracting spring 16, a rod 17, a core 18 and a coil 19 which is connected to the feedline. If the voltage is active at the feedline, that is to say in normal operation, the coil 19 is energized and the core is raised so that the levers 12 occupy the position shown in broken line with the result that the brushes are lifted from the commutator 20 of the motor 7. Hence, the motor is not driven by the current source 10.

If the feedline voltage fails, the high-speed switch so far energized is changed over to the left-hand contact with the result that the load 2 is disconnected from the feedline and is connected to the generator 5. This is effected, in, say, 20 m. sec. Since the field of the generator 5 is already provided and the generator is still driven by the kinetic energy of the flywheel, the load 2 will be supplied from the generator directly after the change-over to the left-hand contact of the high-speed switch 3. Since also the coil 19 is no longer energized, the levers 12 are urged into the position shown under the action of the retracting spring 16, with the result that the brushes 14 are caused to bear on the commutator 20 and the motor 7 is driven by the battery 10 so as to further drive the generator 5.

On re-appearance of the feedline voltage, the high-speed switch 3 is connected back to the right-hand contact and the brushes 14 are again lifted from the commutator 20, while the auxiliary motor 4 again drives the combination so as to be in readiness in the event of a subsequent fault.

The device described is particularly useful for the supply of several intermediate stations (amplifier stations) situated on either side of a master station via co-axial cables.

What we claim is:

1. Apparatus for supplying voltage from a feedline to a load during normal operation and for supplying an auxiliary voltage to said load when said feedline voltage fails whereby said load is always supplied with a substantially uninterrupted voltage, said apparatus comprising a generator for producing said auxiliary voltage, said generator being provided with a permanently energized field, first means connected to said feedline and including a motor connected to said generator for driving said generator when said feedline voltage is present, a second motor connected to drive said generator when said feedline voltage is absent, a high-speed switch responsive to the presence and absence of said feedline voltage for connecting said load to said feedline when said feedline voltage is present and for connecting said load to said generator when said feedline voltage is absent, and means coupled to said feedline and including a current source for energizing said second motor when said feedline voltage is absent whereby said generator is driven in a loaded condition and said auxiliary voltage is supplied to said load, said generator having a kinetic energy at which the magnitude of the voltage supplied to said load is appreciably unaltered in the transition period in which said feedline voltage fails and said auxiliary voltage is first supplied to said load.

2. Apparatus as set forth in claim 1 wherein said second motor is provided with a permanently energized field.

3. Apparatus as set forth in claim 1 wherein said generator is provided with slip rings and brushes, said apparatus further including a transformer with primary and secondary windings, said primary windings being connected to said generator and said secondary windings being connected to said high-speed switch.

4. Apparatus for supplying voltage from a feedline to a load during normal operation and for supplying an auxiliary voltage to said load when said feedline voltage fails whereby said load is always supplied with a substantially uninterrupted voltage, said apparatus comprising a generator for producing said auxiliary voltage, said generator being provided with a permanently energized field, first means connected to said feedline and including a motor connected to said generator, a second motor provided with a commutator having brushes, said first motor driving said generator when said feedline voltage is present, said second motor driving said generator when said feedline voltage is absent, a high-speed switch responsive to the presence and absence of said feedline voltage for connecting said load to said feedline when said feedline voltage is present and for connecting said load to said generator when said feedline voltage is absent, means coupled to said feedline to energize said first motor when said feedline voltage is present whereby said generator is driven in an unloaded condition, and means coupled to said feedline and including a current source for energizing said second motor when said feedline voltage is absent whereby said generator is driven in a loaded condition and said auxiliary voltage is supplied to said load, said current source means including auxiliary means for preventing the brushes of said second motor from contacting said commutator when said feedline voltage is present, said brushes contacting said commutator when said feedline voltage is absent, said generator having a kinetic energy at which the magnitude of the voltage supplied to said load is appreciably unaltered in the transition period in which said feedline voltage fails and said auxiliary voltage is first supplied to said load.

5. Apparatus as set forth in claim 4 wherein said load is constituted by a plurality of telephone amplifier stations and wherein said load is coupled to said apparatus through coaxial cables.

References Cited in the file of this patent

UNITED STATES PATENTS

| 1,960,552 | Richter | May 29, 1934 |
| 2,031,942 | Daguid et al. | Feb. 25, 1936 |
| 2,194,822 | Dannheiser | Mar. 26, 1940 |